I. JOHNSON.
WHEEL.
APPLICATION FILED NOV. 6, 1916.
1,276,371.
Patented Aug. 20, 1918.
2 SHEETS—SHEET 1.
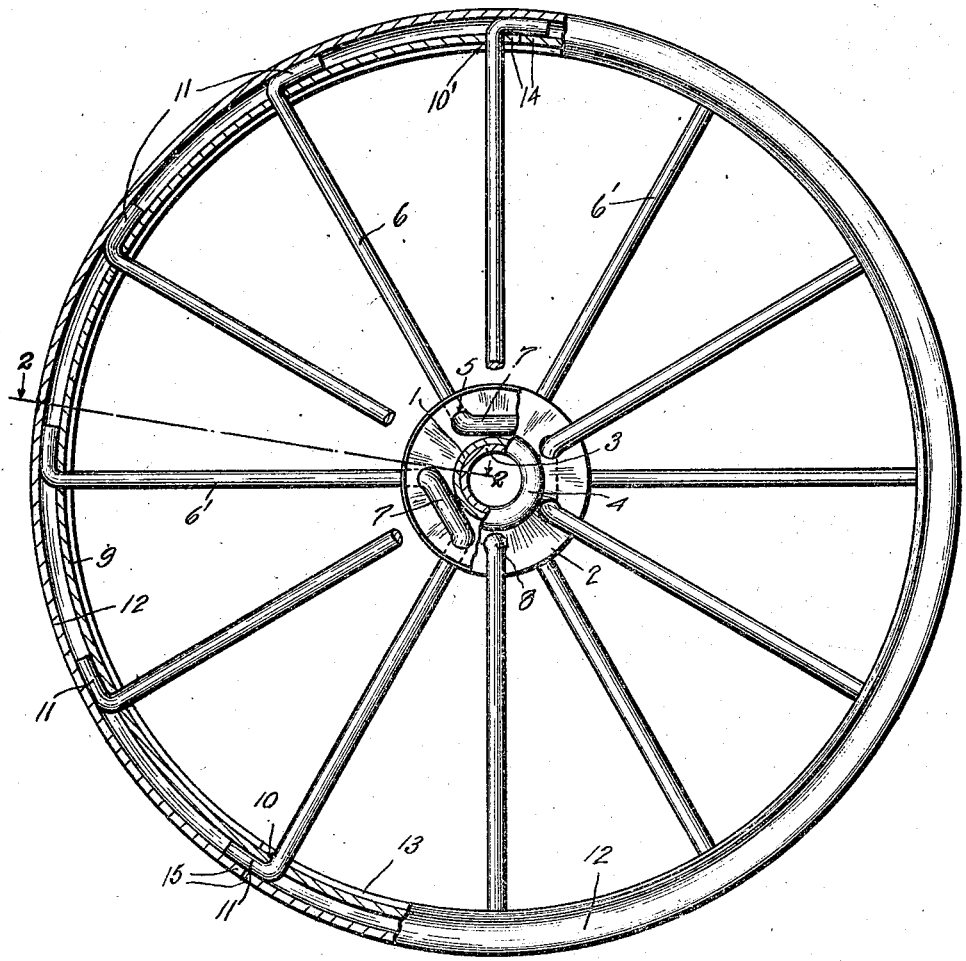
Fig. 1
Fig. 2
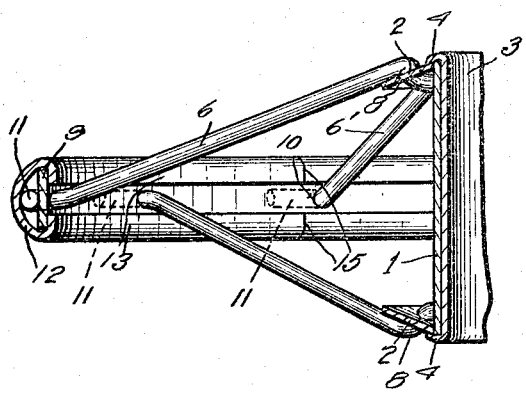
Inventor
Iver Johnson.
By Pierre Barnes
Attorney

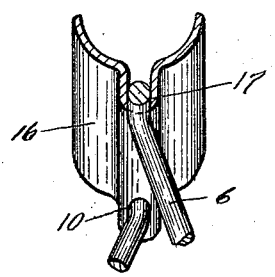
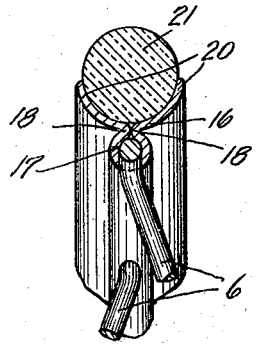
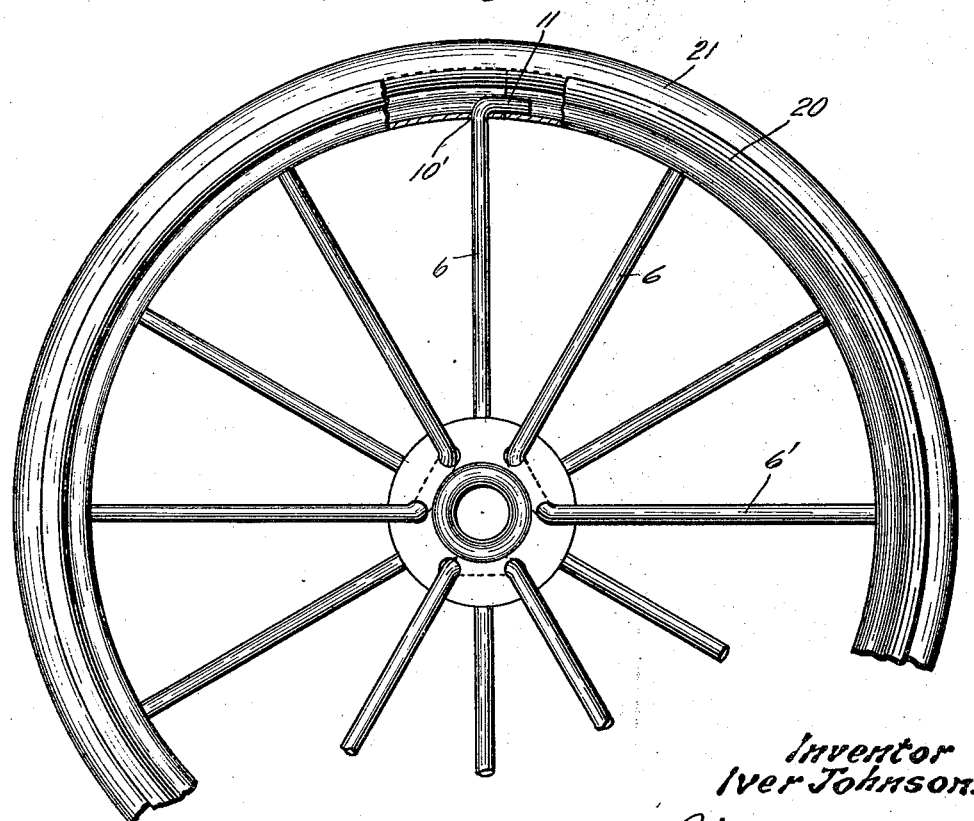

UNITED STATES PATENT OFFICE.

IVER JOHNSON, OF VANCOUVER, BRITISH COLUMBIA, CANADA.

WHEEL.

1,276,371.  Specification of Letters Patent.  Patented Aug. 20, 1918.

Application filed November 6, 1916. Serial No. 129,684.

*To all whom it may concern:*

Be it known that I, IVER JOHNSON, a citizen of the United States, residing at Vancouver, in the Province of British Columbia and Dominion of Canada, have invented certain new and useful Improvements in Wheels, of which the following is a specification.

This invention relates to improvements in wheels, and particularly to wheels adapted for use on baby buggies, small carts and the like.

One of the objects of the invention is the provision of a wheel of simple construction which is strong and efficient in use and can be manufactured with economy in material and labor.

A further object of the invention resides in the construction of the rim of the wheel and method of fixedly securing the spokes thereto, whereby a neat, strong and serviceable wheel rim is afforded.

The invention consists in the novel construction and combination of parts of a wheel, as will be fully described in the following specification, illustrated in the accompanying drawings and finally set forth in the appended claim.

Referring to said drawings, Figure 1 is a view in side elevation of a wheel embodying my invention with a portion of the rim and axle housing broken away to disclose the interior and illustrate the method of manufacture.

Fig. 2 is a fragmentary cross-sectional view on line 2—2 of Fig. 1.

Fig. 3 is a fragmentary view in side elevation of a modified form of my invention, partly broken away, adapting the invention to use with wheels bearing rubber tires.

Fig. 4 is a cross-sectional view of the form shown in Fig. 3.

Fig. 5 is a cross-sectional view of the form shown in Fig. 3 before the same is completed, and before the rubber tire is applied thereto.

Referring to said views, the reference numeral 1 indicates a tubular sleeve over which at each end circular centrally apertured disks 2 are pressed, which disks are formed of somewhat concavo-convex configuration.

A tubular bushing 3 is inserted within the bore of the sleeve 1 and turned outwardly at its ends to form out-turned flanges 4 which bear against the outer concavo-convex surface of said disks and secure them in rigid position on the sleeve. The construction thus formed constitutes the hub of the wheel which is the subject matter of my invention.

The spokes of said wheel are formed of wire which is threaded through apertures 5 formed in the respective disks 2. Each of said wires form two spokes 6 and 6', their intermediate portion 7 extending between said apertures.

Where said wire is drawn through the apertures 6 an offset shoulder 8 is formed in said wires, whereby bearings are provided by the disk and the spokes are directed in relatively straight lines from the outside of the respective disks to the annular rim 9. Said disks are inclined inwardly so that their outer surfaces are directed in converging lines toward the middle of the rim. Said rim is provided with a plurality of evenly spaced holes 10 through which the spokes 6 and 6' connected to the respective disks 2 are protruded in alternate relation. The ends 11 of said spokes projecting through said holes are given substantially right-angled bends to cause such ends to lie evenly and closely to said rim and in the same condition.

A tire 12 consisting of a strip of sheet metal is then placed over the rim and with its middle portion overlying the projecting ends 11 of the spokes, and flanged inwardly at its lateral edges, as at 13, to engage the inner surface of said rim, thus affording a smooth transversely curved outer running surface for the wheel and a neat and strong reinforcing element, as well as a cover for the ends 11 of the spokes.

The ends 14 of said rim are abutted together and one of said holes, as 10', is positioned in proximity to one of said ends 14 whereby the bent end 11 of one of said spokes is caused to extend over the joint and thus prevent the same from springing outwardly. Similarly, the joint 15 between the ends of the tire 12 is positioned over the end 11 of a spoke so that the same are supported from being pressed inwardly and the tire distorted by violent shocks or bumps received during service.

Referring to Figs. 3, 4 and 5, illustrating a modified form of my invention, wherein like reference characters denote like parts as in the preceding views, the rim 16 is first formed with a symmetrically arranged annular channel 17 and provided with a plurality of spaced holes 10 into which the spokes 6 and 6' extend, as previously described with reference to the other form.

The spoke ends 11 are received in said channel 17, as illustrated in Fig. 5, whereupon the metal of said rim disposed outwardly of the space occupied by said spoke ends is forced inwardly to form shoulders 18 that lie against the outer sides of the spoke ends and prevent the latter from being pushed through when weight is borne upon the wheel.

Flanges 20 extend in outwardly flaring directions and afford a curved seat for the reception of a rubber-tire 21. Said tire is of solid or other suitable construction and is stretched to enable it to be seated in said seat, and is cemented to maintain it in fixed condition.

One of the holes, as 10', is positioned in proximity of the abutting ends of the rim 16 whereby the bent end 11 of a spoke is lapped over said joint and assists in maintaining said joint in alined condition.

What I claim as my invention, is—

A wheel having a hub formed of two tubular sleeved members, annular disks provided on the outer of said members and held against withdrawal by flange elements of the inner member, said disks being each provided with a series of apertures, a wheel rim, and spokes connecting said rim with the respective disks, each pair of spokes being formed of a piece of wire bent to provide a portion located at one side of a disk and thence extending as shoulders through the respective of said disk apertures and then bent and extending radially to said rim.

Signed at Seattle, Washington, this 12th day of October, 1916.

IVER JOHNSON.

Witness:
E. PETERSON.

Copies of this patent may be obtained for five cents each, by addressing the "Commissioner of Patents, Washington, D. C."